United States Patent Office 3,173,753
Patented Mar. 16, 1965

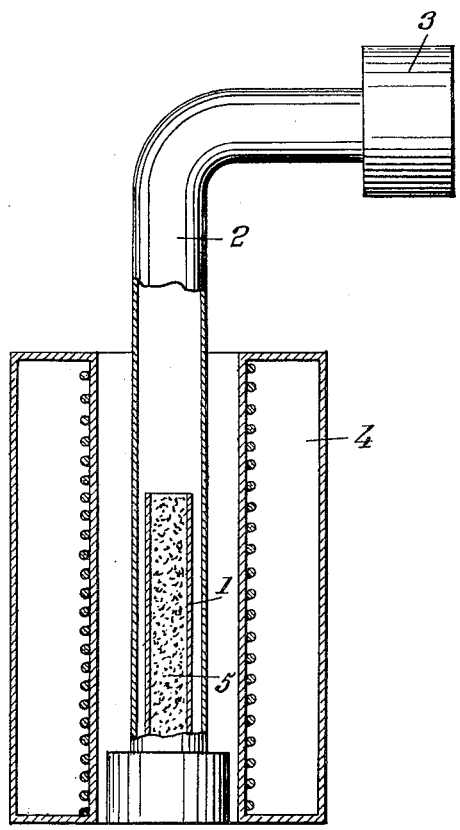

3,173,753
METHODS FOR MAKING URANIUM CARBIDE ARTICLES
André Accary and Jacques Dubuisson, Paris, France, assignors to Commissariat à l'Energie Atomique, Paris, France, an organization of France
Filed Nov. 2, 1960, Ser. No. 66,739
Claims priority, application France, Nov. 6, 1959, 809,566
2 Claims. (Cl. 23—14.5)

The present invention relates to methods for making articles of uranium carbide, and in particular the monocarbide, UC, from a mixture of uranium and graphite powders, the uranium powder being preferably a powder obtained by reduction of the $UO_2$ oxide by calciothermy.

The object of this invention is to provide a method of this kind which is simpler to carry out than those known up to now and which permits of obtaining products of high value.

According to our invention, a mixture of uranium and graphite powders in suitable proportions (averaging stoichiometric proportions) is subjected, in moulds under vacuum, to a gradual heating serving to increase the specific gravity of the mixture, account being taken of the fact that the reactions between U and C start at relatively low temperatures, said mixture being preferably treated mechanically to increase, for instance by vibrations, its specific gravity, this treatment supplying presintered articles of a specific gravity equal to 56% of the theoretical specific gravity of uranium carbide and of a mechanical consistency which permits of using them as such for various applications, in particular as fuel in nuclear reactors. Of course, the specific gravity may be further increased, in particular through an electrothermal process making use of the resistivity of said articles.

A preferred embodiment of the present invention will be hereinafter described with reference to the appended drawing given merely by way of example.

The only figure of this drawing shows in diagrammatic vertical section an apparatus for making uranium carbide articles according to the invention.

Up to the present time, uranium carbide, and in particular uranium monocarbide, was obtained either by melting or by sintering under high pressure.

The melting method comprises a first melting step at a temperature averaging 1,150° C. This gives a relatively porous body which must be further melted at 2,500° C. in order to obtain the desired specific gravity of the monocarbide UC, i.e. 13.6. But, on the one hand, it is very difficult to have retorts capable of withstanding such high temperatures and, on the other hand, the final product is impure as it contains not only UC but $U_2C_3$ and $UC_2$.

The high pressure sintering method comprises the step of compressing, in a mould, a mixture of uranium powder and graphite powder, under a mechanical pressure averaging two tons per square centimeter and with a heating under vacuum at temperatures averaging 1,100° C. By means of such a method, it is possible to obtain a specific gravity of about 90% of the theoretical density but it is of course extremely difficult to achieve under a vacuum both the application of the mechanical pressure and the heating at high temperature.

The present invention is based upon the fact that the reactions between uranium and graphite in the powder state already start at low temperatures and that it is possible, by a suitably gradual heating under vacuum (starting preferably from a mixture the specific gravity of which has been already increased, for instance to a value ranging from 5 to 5.5, by a mechanical treatment such as a vibratory treatment), to obtain by reaction of graphite on the solid phases alpha, beta, gamma of uranium, compact articles without cracks, easy to remove from the mould and of a specific gravity which may be as high as from 50 to 60% of the theoretical specific gravity.

A study of the expansion data seems to indicate that the reactions between uranium and carbon start at about 450° C. so that it is of interest to provide one or several low temperature heating steps.

Up to 750° C., that is to say as long as uranium is in the alpha and beta phases, the reactions are slow. However, the specific gravity of the mixture start increasing. Then, above the point of transformation of beta into gamma, that is to say above 750° C., the reactions become faster and they are accompanied by a substantial thermal effect which requires precautions, that is to say a relatively low rise of the temperature, in order to avoid bursting and cracking.

It should also be noted that the initial steps of treatment at moderate temperatures (in particular up to 450° C.) are also important from another point of view. They ensure decomposition of the impurities generally included in uranium powder (in particular when it has been obtained by calciothermy), that is to say for instance uranium hydride $UH_3$ and uranium oxide $UO_2$.

The hydride decomposes at a temperature of about 250° C. whereas the $UO_2$ oxide which surrounds the uranium grains desintegrates at about 400° C., by mechanical bursting of the oxidized layer.

In accordance with these observations, the method according to our invention should preferably be carried out as follows:

The initial mixture is first made of suitable grain size and in suitable proportions.

For instance, the uranium powder will be that obtained by calciothermy from the $UO_2$ oxide with a grain size of 20 microns. It will contain for instance impurities corresponding to from 0.5 to 1.5% of oxide and 2% of hydride.

The grain size of the graphite will range for instance from 1 to 2 microns, but it may be greater.

As for the proportions, they are close to stoichiometric proportions, that is to say there is 4.55% of carbon. However, the amount of carbon may be slightly smaller, for instance 4.50%.

The mixture is homogenized in a mixing apparatus, for instance a mixer of cubic shape or in an apparatus with rotary blades. Then this mixture is poured into the mould, which is for instance a graphite mould shaped to obtain for instance a bar, a tubular piece, etc.

The specific gravity of the mixture is first increased by a vibrating treatment, which is very important for the characteristics of the final product. Experience teaches that when the starting materials are those above referred to, a vibrating treatment leading to a specific gravity ranging from 5 to 5.5 permits of avoiding cracks or deformations in the final articles.

Mould 1, thus filled with the vibrated mixture 5, is placed in a space 2 where a vacuum has been produced. This space is for instance the inside of an alumina tube connected to a vacuum source 3. We first produce a primary vacuum and then effect a secondary degassing until the vacuum corresponds to a residual pressure of about $10^{-5}$ mm. of mercury.

The heating operation is then performed in at least one suitable furnace 4, this heating, which is in particular obtained electrically, comprising for instance the following steps:

(a) Heating from 0 to 250° C. effected at the rate of 100° C. per hour, the temperature being maintained for two hours at 250° C. to ensure complete degassing and a slow decomposition of the uranium hydride contained in the initial powder;

(b) Heating from 250 to 450° C. at the rate of 200° C. per hour;

(c) Heating from 450 to 750° C. effected at a slower rate, for instance 100° C. per hour so as to obtain a coherent article owing to a moderate speed of the reaction between U and C;

(d) Heating from 750 to 900° C. at a still slower rate, for instance 50° C. per hour so as to account for the transformation of beta into gamma and also because the reactions become accelerated and are accompanied by a substantial thermal effect; this precaution permits of avoiding cracks;

(e) Heating from 900 to 1200° C. at a higher rate for instance 200° C. per hour, after which the article is left for two hours at 1200° C. to finish the reaction and to obtain a good homogeneity of the article by solid phase diffusion.

The article is then finished and may be cooled for instance at the rate of 300° C. per hour.

This article can easily be removed from the mould since, while having kept its general shape, it has had its density raised from 5.5 to 7.5. This specific gravity ranges from 50 to 60% of the article's specific gravity.

Articles of this kind (rods, tubes and so on) have good mechanical properties and may be used in many applications, for instance as ceramic fuels. They can be made of any desired shape. These articles may also be considered as pre-sintered intermediate products from which can be obtained denser carbides, through any suitable method.

For instance, advantage may be taken of the electric resistivity of these articles for obtaining supplementary sintering and increase of the specific gravity through electrothermic processes, that is to say either by induction of by direct Joule effect, the tubes or rods in question being used as resistors or in another way. Of course, said tubes or rods may be used as electrodes in treatment tanks for the obtainment of molten carbide by electrothermy.

The resistivity of a bar having an apparent specific gravity equal to 7.5 is about 1.8, $10^{-4}$ ohms per centimeter.

The method according to the present invention permits a great reduction of the cost of treatment.

What we claim is:

1. A method of making uranium carbide articles which comprises mixing uranium powder and graphite powder substantially in stoichiometric proportions, pouring this mixture into a mould, subjecting the mould to a vibrating treatment so as to increase the specific gravity of the mixture up to a value ranging from 5 to 5.5, placing the inside of said mould under vacuum and heating this mould in the following conditions: from ordinary temperature to 250° C. at the rate of 100° C. per hour, leaving the mould for two hours at 250° C. rising the temperature from 250° C. to 450° C. at the rate of 200° C. per hour, raising the temperature from 450° C. to 750° C. at the rate of 100° C. per hour, raising the temperature from 750° C. to 900° C. at the rate of 50° C. per hour, raising the temperature from 900° C. to 1,200° C. at the rate of 200° C. per hour, leaving the mould at 1,200° C. for two hours, and cooling down at the rate of 300° C. per hour.

2. A method of making uranium carbide articles which comprises mixing uranium powder and graphite powder substantially in stoichiometric proportions, pouring this mixture into a mould, subjecting the mould to a vibrating treatment so as to increase the specific gravity of the mixture up to a value ranging from 5 to 5.5, placing the inside of said mould under vacuum and heating this mould in the following conditions: from ordinary temperature to about 450° C. at a rate of temperatuer increase rising with increasing temperature from about 100° C. per hour to about 200° C. per hour, raising the temperature from about 450° C. to about 900° C. at a rate of temperature increase falling with rising temperature from about 100° C. per hour to about 50° C. per hour, raising the temperature from about 900° to about 1200° C. at a rate of temperature increase averaging about 200° C. per hour, terminating the reaction at about 1200° C., and then cooling the mould.

References Cited in the file of this patent

UNITED STATES PATENTS

| 2,526,805 | Carter et al. | Oct. 24, 1950 |
| 2,569,225 | Carter et al. | Sept. 25, 1951 |
| 3,031,389 | Goeddel | Apr. 24, 1962 |

OTHER REFERENCES

Finniston et al.: "Metallurgy and Fuels," Series V of Progress in Nuclear Energy, pages 435, 442–445 (1956).

Proceedings of the Second International Conference on the Peaceful Uses of Atomic Energy, vol. 6, pp. 544, 551, 553, 554, 557, 558, Sept. 1–13, 1958.

AEC Document NAA–SR–4155, pp. 1–8, 14, 15, Oct. 1, 1959.

ORO–248, page 14, Dec. 14, 1959.

NAA–SR–4904, page 14, March 15, 1960.